June 12, 1928.

S. M. DICK 1,673,066

APPARATUS FOR DEHYDRATING LIQUIDS

Filed Oct. 22, 1920

4 Sheets-Sheet 1

INVENTOR.
SAMUEL M. DICK.
BY Paul & Paul
HIS ATTORNEYS.

June 12, 1928.

S. M. DICK

APPARATUS FOR DEHYDRATING LIQUIDS

Filed Oct. 22, 1920

1,673,066

4 Sheets-Sheet 2

INVENTOR
SAMUEL M. DICK
BY
Paul & Paul
HIS ATTORNEYS

June 12, 1928.

S. M. DICK 1,673,066

APPARATUS FOR DEHYDRATING LIQUIDS

Filed Oct. 22, 1920 4 Sheets-Sheet 3

INVENTOR
SAMUEL M. DICK.
BY
Paul & Paul
HIS ATTORNEYS

Patented June 12, 1928.

1,673,066

UNITED STATES PATENT OFFICE.

SAMUEL M. DICK, OF MINNEAPOLIS, MINNESOTA, ASSIGNOR TO INTERNATIONAL DRY MILK COMPANY, OF MINNEAPOLIS, MINNESOTA, A CORPORATION OF DELAWARE.

APPARATUS FOR DEHYDRATING LIQUIDS.

Application filed October 22, 1920. Serial No. 418,845.

My invention relates to apparatus in which the dehydration of milk or other liquids containing solids in solution is carried out by spraying the milk or other liquid in a chamber or cell, evaporating the water constituents by subjecting the finely divided spray to a series of heated opposing air currents, carrying away the moisture thereby evaporated by exhausting the moisture laden air from the cell and gravitating the drying solids towards the bottom of the cell from which they are collected in the form of a dry powder.

My invention relates more particularly to and is an improved and simplified construction of the dehydrating cells shown and described in my application dated Nov. 12, 1919, Serial No. 337,581 under Patent 1,450,840, April 3, 1923, in which patent a double cell comprising a primary condensing cell and a separate powdering cell is required for the complete carrying out of the dehydrating process.

The object of the present invention is first: to produce a single dehydrating cell of the same general class in which a liquid like milk may be reduced to a uniform dry powder in one passage through the cell without any previous condensation or other treatment. Second: to produce in this cell a whole milk product or powder of a uniform quality in which the butter fat globules will be encysted for preservation and protection and third: to produce in the cell this whole milk product with encysted butter fat globules at a comparatively low temperature and with a shortened time exposure of the milk to the evaporating air currents by which the butter fat globules and other milk constituents will be protected from injury.

My invention consists in the construction and combinations of a cell as hereinafter described in the specification and illustrated in the accompanying drawings, the novel features of the invention being more particularly pointed out in the claims.

Figure 1:
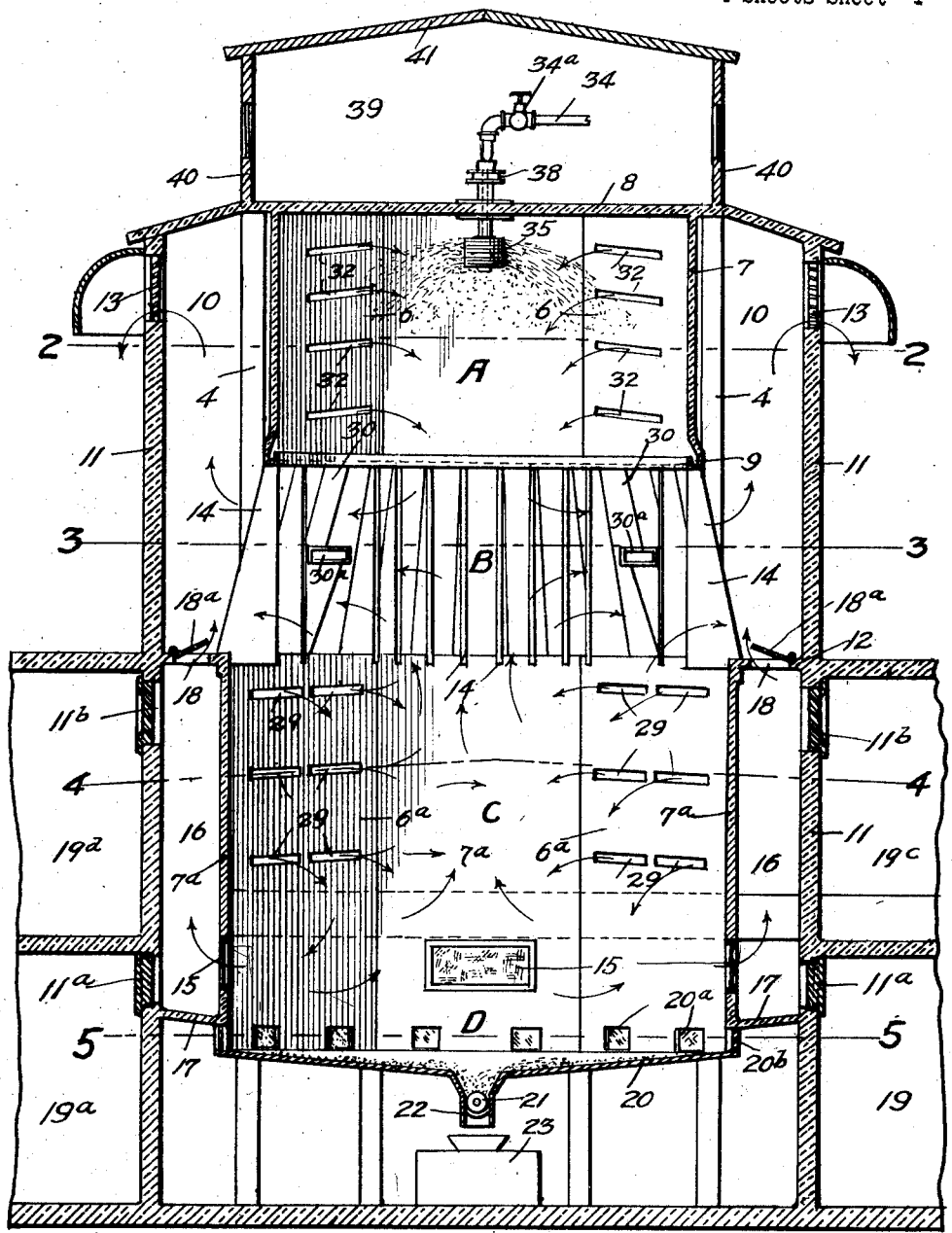
Figure 2:
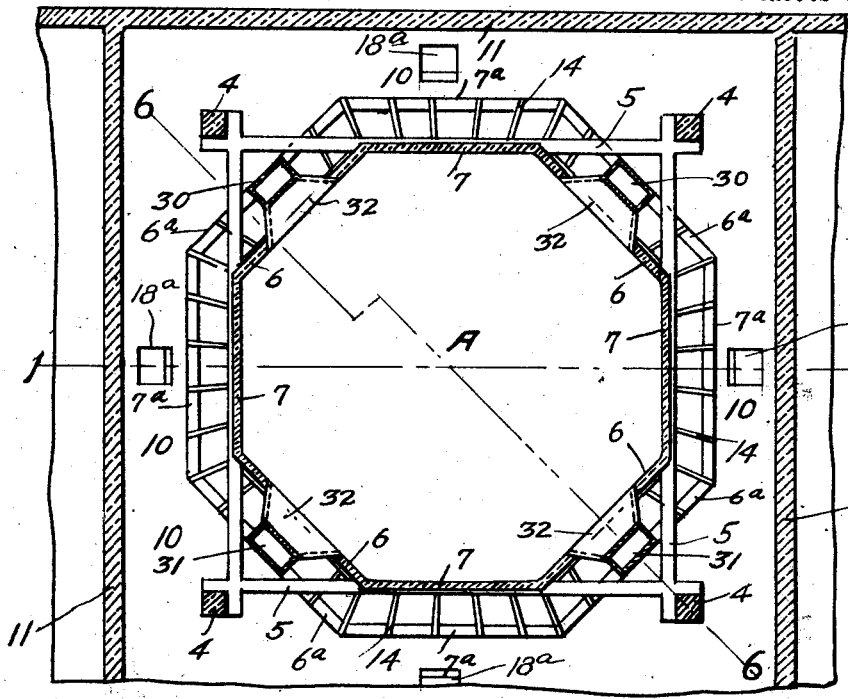
Figure 3:
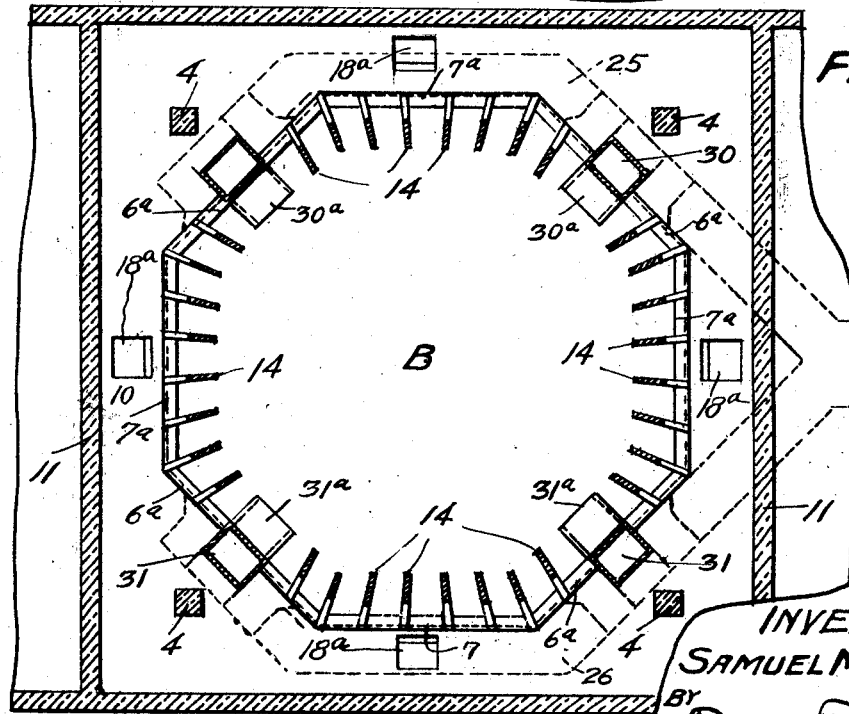
Figure 4:
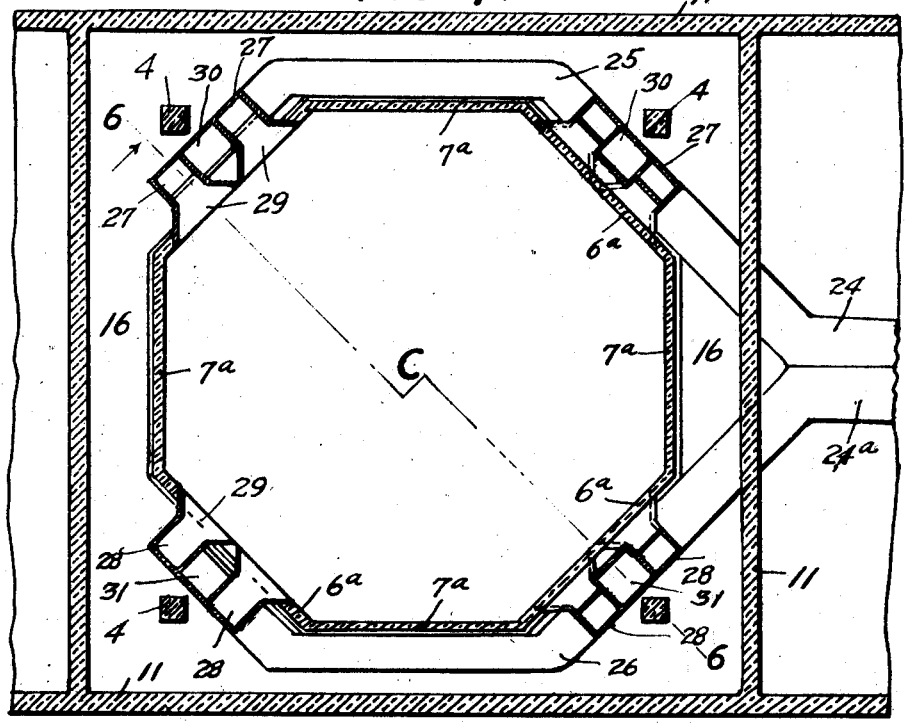
Figure 5:
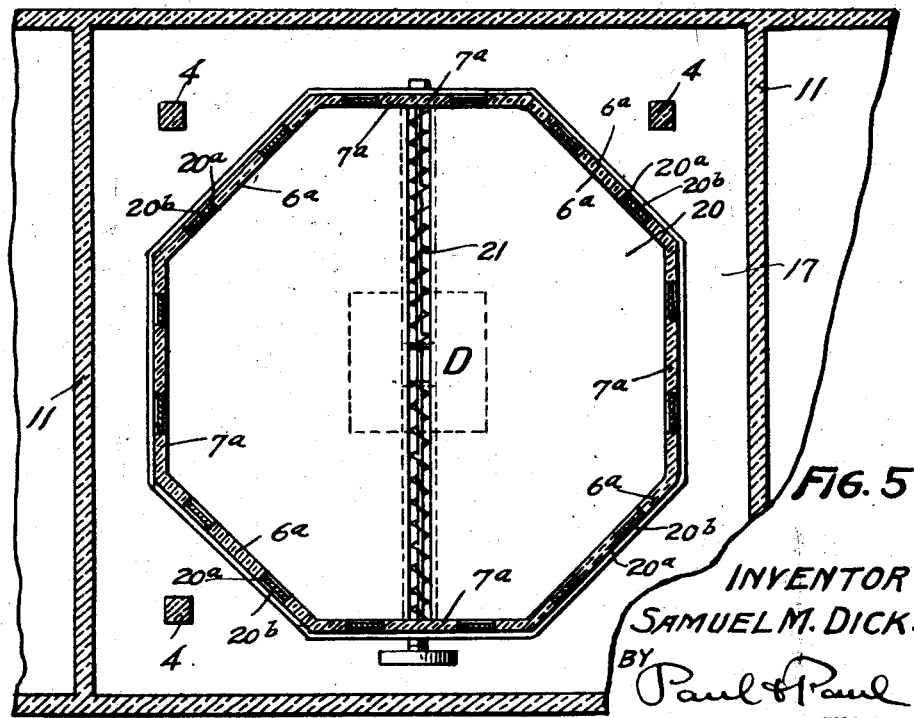
Figure 6:
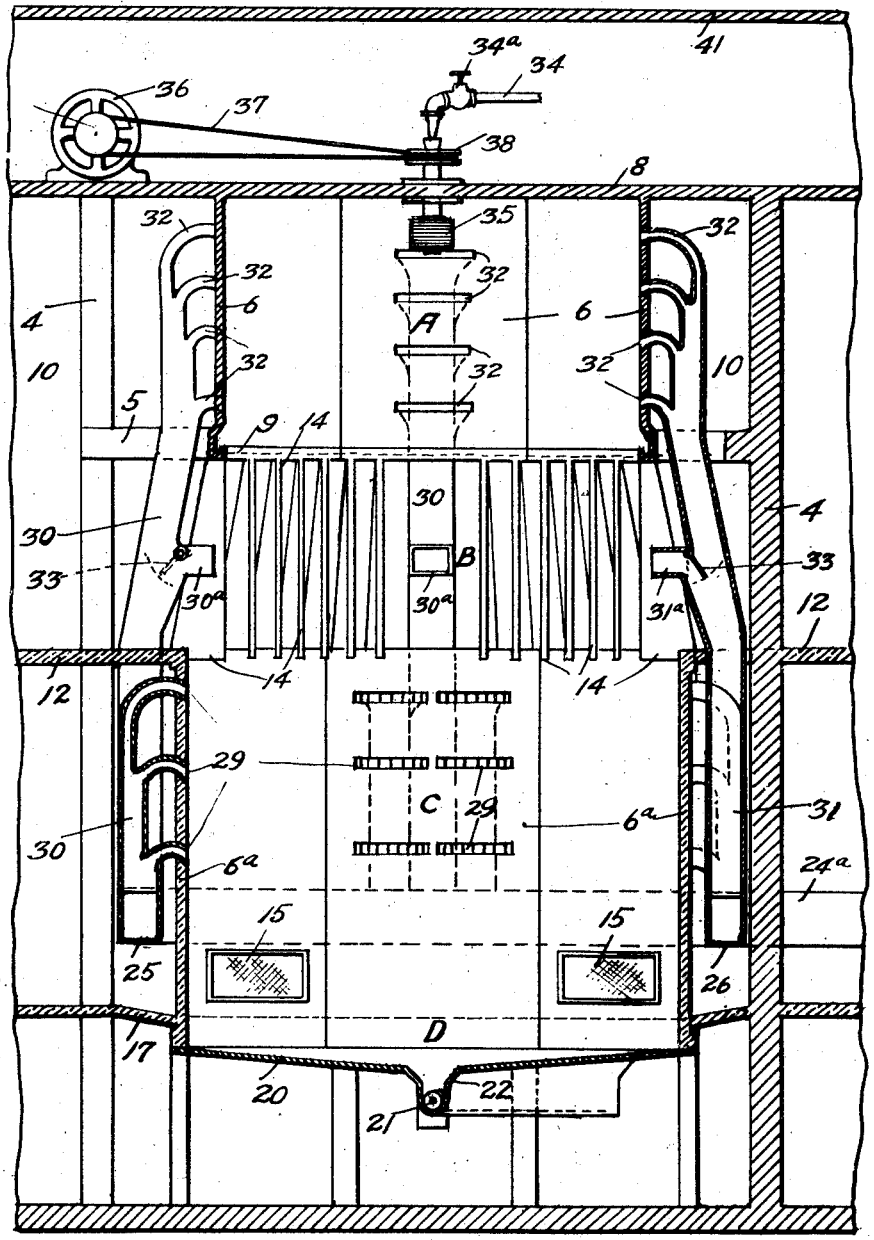

In the drawings, Figure 1 is a vertical section of a dehydrating cell embodying my invention, the section being taken on the line 1—1 of Figure 2, Figure 2 is a horiozntal section on the line 2—2 of Figure 1, Figure 3 is a similar section on the line 3—3 of Figure 1, Figure 4 is a similar section on the line 4—4 of Figure 1, Figure 5 is a similar section on the line 5—5 of Figure 1, Figure 6 is a vertical diagonal section through the cell taken on the line 6—6 of Figures 2 and 4.

In carrying out my invention I provide a cell preferably of octagonal form in horizontal cross section as shown in the drawings although it may be carried out in a cell that is circular, rectangular or other form in cross section. In constructing the cell I divide it into four superimposed and merging zones, which I will denote consecutively A, B, C and D beginning from the top of the cell and which functionally may be described as the upper mixing and evaporating zone A, the exhaust or dead air zone B, the final drying or finishing zone C and the receiving and collecting zone D.

The upper zone A is supported upon vertical posts 4, preferably by means of cross girders 5, and is enclosed by the octagonally arranged vertical walls 6 and 7, and a ceiling or upper floor 8. This zone opens downward directly into the exhaust zone B. Around the lower outer portion of the zone A I prefer to arrange a trough 9.

The exhaust or dead air zone B is arranged between the upper evaporating zone A, and the finishing zone C, and communicates directly with both of these zones. Surrounding the upper portion of the cell comprising the zones A and B is an air space or chamber 10 enclosed by the exterior wall or walls 11, the ceiling or upper floor 8, which extends over such chamber, and a floor 12. The chamber 10 connects the exhaust zone B with the outer air through louvers 13 (see Figure 1) which prevent swirling of the air as it leaves this chamber and this chamber is preferably of considerable area or capacity so that air from the cell may move slowly and without appreciable currents through it to the outer air.

The dead air or exhaust zone B of the cell may be directly open to the chamber 10 without any form or enclosure, or may be enclosed in various skeleton forms, or with various materials through which air will freely pass. I prefer, however, to arrange a series of deflecting plates 14, radially around the center of the zone, supporting these plates in any suitable manner.

The zone C is preferably of greater diameter than the upper zone A, and the deflecting plates 14, arranged between the zones A and C, are preferably provided with the vertical inner edges and the sloping outer ends, as shown in Figures 1 and 6 of the drawings. The plates 14 may also serve for the skeleton frame around and upon which suitable cloth may be mounted to partially or entirely enclose the dead air zone B.

The zone C is enclosed by walls $6^a$ and $7^a$, in the lower part of which I preferably provide exhaust doors 15 preferably covered with breathing cloth through which air from this zone may have exit into a surrounding chamber 16, enclosed by the walls 11 and floors 12 and 17. Openings 18 provided with suitable trap doors $18^a$ may be provided in the floor 12 through which air may pass from the chamber 16 into the upper chamber 10 and thence escape to the outer air through the louvers 13.

The lower or collecting zone D consists substantially of the space enclosed by the walls $6^a$ and $7^a$ below the exhaust doors 15 and terminates at the collecting floor 20, which forms the bottom closure of the cell. This floor preferably slants downward from the sides towards the center, where I preferably arrange a spiral conveyer 21 in a trough 22, adapted to discharge the finished material into a suitable cooling and sifting machine 23.

The collecting or receiving zone D projects a short space below the outer floor 17 surrounding the cell and forming the bottom of the chamber 16 and a series of openings $20^a$ normally closed by the doors or windows $20^b$, are arranged in the wall around the zone D just above the floor 20. These doors, some of which may be provided with glass, through which the interior of the cell may be observed by the attendant, open outward when it is desired to clean the floor 20 or brush the material collected on this floor into the conveyer 21. Doors $11^a$ are provided in the surrounding walls 11 through which access may be had to the chamber 16 from the boiler room 19 and work room $19^a$ and doors $11^b$, preferably provided with louvers, (not shown) are arranged in the walls 11 through which access may be had to the trap doors 18 from the rooms $19^c$ and $19^d$.

Air is supplied to the cell from a fan or blower (not shown in the drawing) preferably through air trunks 24 and $24^a$ having main supply pipes 25 and 26, partially passing around the cell at the lower portion of the finishing zone C. From these branch pipes lead upwards a series of conductors 27 and 28, respectively, preferably arranged in pairs and terminating with inwardly curved nozzles 29, passing through the walls $6^a$ to the zone C of the cell. I prefer to provide each vertical conductor with three nozzles 29, spaced one above the other, at varying distances and arranged with each tier of nozzles opposite another series extending through the opening through the walls of the cell. The nozzles are shown as arranged directly opposite each other, and while this is the preferred arrangement it is not a necessary one and I do not limit myself thereto. Between the members of each pair of conductors 27 and 28, I preferably arrange vertical ducts 30 and 31, passing from the main supply pipes 25 and 26, and terminating above with the inwardly curved nozzles 32, leading to the upper evaporating or mixing zone A of the cell. I have shown a series of four nozzles, laid one above the other for each pipe 30 and 31 and these preferably enter the cell at opposite sides of the zone through the cell walls 6. Intermediate the zones A and C, and in the dead air line space of the exhaust zone B, I preferably provide air shunts $30^a$ and $31^a$ controlled by a valve or damper 33 and leading inwardly from the vertical air pipes 30 and 31, through which any light current of air may be directed into the dead air space of the exhaust zone to warm the air in the dead air space and increase its humidity absorbing properties.

The milk is delivered in regulated quantity from a supply pipe 34 having a control valve $34^a$, into the upper zone A of the cell in a series of thin sheets or sprays produced by a suitable centrifugal sprayer 35 mounted usually below the ceiling 8 at substantially the center of the cell and driven by any suitable means, such as a motor 36, belt 37 and pulley 38.

The air is heated preferably before it enters the trunks, pipes and distributing conductors above described and the degree of temperature varies preferably with the quality of the liquid or its solid contents, but is generally regulated to be higher for the lower zone C than for the upper evaporating zone A. In the process of dehydration of milk, the air enters the upper zone A through the nozzles 32 from opposite sides of the cell and generally in currents directed towards the center of the cell, which some of the currents reach. The heated air immediately mixes with the finely divided or atomized spray of milk thrown from the centrifugal sprayer 35, and the homogeneous mixture of the heated air and atomized liquid causes a practically instantaneous evaporation and the air takes up a maximum amount of moisture. The moisture-laden air and milk constituents gravitate towards the exhaust or dead air zone B there being no other exit from the zone A. Simultaneously with the admission of air to the zone A, a volume of air, preferably heated to a higher temperature, is admitted to the lower finishing zone C through the nozzles 29 and in a variety of directions and velocities. This volume of heated air naturally rises towards the exhaust and dead air zone B, where it meets the falling volume of air from the upper zone A creating a substantially neutral or calm zone line through the horizontal center of the zone B.

From the zone B the air from both zones A and C then drifts out between the plates 14 through the large expansion chamber 10 in a movement so slow that currents are hardly preceptible, and reaches the outer air through the louvers 13. By reason of the slow movements of the air from the zone B, the solids separated by evaporation readily fall across the calm or neutral part of the zone B and are then caught and enveloped in the cyclical cross currents in the finishing zone C. Here the gravitating particles are retarded in their downward motion by the great number of circular horizontal and vertical air currents rolling and moving the particles hither and thither until all moisture is absorbed in the air and the fatty globules of the milk encysted in the colloids of the skim milk solids and when these accumulate sufficient weight, they find their way through the currents of air with the encysted fat globules and gravitate to the floor 20 at the bottom of the collecting zone D, from whence they are carried to the cooling and sifting machine 23 by the conveyer 21.

The air volume in the finishing zone C is generally admitted through about twice as many nozzles as in the upper evaporating zone A, and at a considerable higher temperature, preferably about 180 to 190 degrees F. It naturally has a general upwardly moving tendency, but the reduction of temperature caused by the rapid moisture evaporation greatly retards the upward movement of the air volume and as some of the air may escape through the aspirating cloth in the doors 15, and as these doors may also be adjusted to be partially or fully open during operation, the strength of the general upward movement of the air volume in the finishing cell C may be accurately controlled to prevent solids from being carried outwards from the exhaust or dead air zone B, by causing a sufficient part of the heavier moisture laden air to be drawn off just above the collecting cell D. The air thus withdrawn through the doors 15 enters the chamber 16 and its exit to the upper chamber 10 and outer air may be further controlled by the trap doors 18ª. If the air passing upwards through the openings 18 should create too strong movements of the air around the exhaust zone B, the doors may be closed and the air conducted direct to the outside from the finishing zone C through the doors, or louvers 11ᵇ without passing through the exhaust zone B. However, it is very desirable to have a considerable percentage of the air from the finishing zone pass out by way of the dead air zone, hence that zone is generally made large enough for the whole volume of air coming into both evaporating zones to pass out through it without producing strong currents or eddies. As further preventives of solids drifting out through the dead air zone B, the lower finishing zone C is of considerably larger area in horizontal cross section and the radially arranged plates 14 surrounding the zone B and projecting over the lower zone C prevent swirling and eddying of the air as it leaves the dead air zone. The plates 14 also form a skeleton frame upon which aspirating or breathing cloth may be mounted to prevent outdrifting of the solids should conditions require it. To further control the movements of the air in the exhaust zone B, light currents of air from the air ducts 30 and 31, regulated in strength by the valves or dampers 33 may be directed through the ducts 32 from opposite sides inwards in the dead air line of the exhaust zone B. The trough 9 around the bottom of the upper evaporating zone A, the sides of which preferably slant outwards so that the inner edge of the trough will not project beyond the inner plane of the walls 6 of the zone, is for the purpose of receiving any liquid, which may accidentally collect on the walls of the cell during operation and to prevent the said liquid from passing across the exhaust in drops to the finishing zone below. The division floors 12 and 17 serve the operators in caring for or draining this trough but principally for adjusting and regulating the flow of air and the general functioning of the dehydrating apparatus, and the upper room 39 enclosed by the walls 40 and roof 41 is preferably a general work room for the attendants. It is evident that various modifications may be made in the details of construction without departing from the principle and scope of the invention and I do not therefore limit the claims to the exact construction shown.

I claim as my invention:

1. A dehydrating cell comprising an upper liquid evaporating compartment closed at its top and with an opening in its bottom, means for introducing into the compartment the material to be dried, a lower drying compartment closed at its bottom and with an opening in its top, means for directing air currents into both of said compartments, an intermediate compartment communicating with said compartments and having exhaust openings in its sides through which air from said upper and lower compartment is exhausted, and means for exhausting air from said lower compartment independently of said intermediate compartment, said means including an outlet below the air admission inlets in the lower chamber.

2. A dehydrating cell comprising an upper liquid spraying and evaporating compartment and having means for introducing thereinto material to be dried, a lower drying and finishing compartment, means for directing air currents into the sides of each of said compartments in opposite directions, an intermediate exhaust compartment through which the air from the upper and lower compartment may be exhausted with radial air deflecting members surrounding said exhaust compartment.

3. A dehydrating apparatus comprising an outside casing, an evaporating compartment in the upper portion of the casing, an apparatus for spraying the material to be dried in said compartment, and a lower drying and finishing compartment in the lower portion of the casing with air inlets through the sides of both compartments, and connections for conducting air into said compartments, a middle compartment in open communication with said upper and lower compartment and having openings through its sides communicating through said casing with the outside air.

4. A dehydrating apparatus comprising an outer casing, an upper compartment in the casing open at its bottom and having therein a device for spraying the material to be dried, and a lower compartment also in said casing open at its top, there being side air spaces between both said compartments and the casing and a middle compartment in communication with both said upper and lower compartments having exhaust openings at its sides communicating with the air space in the casing, said casing having air outlets therein, and means for conducting heated air and introducing it through the sides of both upper and lower compartments.

5. A dehydrating apparatus comprising an outer casing, an upper compartment open at its lower end with apparatus therein for spraying the material to be dried, a lower compartment with an opening at its upper end, there being an air space between both said compartments and the outer casing, a middle compartment between said upper and lower compartments and in open communication therewith, said middle compartment having exhaust openings in its sides communicating with the air space in the casing, said casing having air outlets, means for conducting heated air and introducing it at oppositely disposed places in the sides of said upper and lower compartments, said means also having controlled communication with said middle compartment.

In witness whereof, I have hereunto set my hand this 19th day of October, 1920.

SAMUEL M. DICK.